(12) United States Patent
Moon

(10) Patent No.: US 6,373,886 B1
(45) Date of Patent: Apr. 16, 2002

(54) POWER SUPPLY CIRCUITS FOR DATA ACCESS ARRANGEMENT ENABLING MODEM OPERATION OVER A PRIVATE LINE

(75) Inventor: David M. Moon, New Hartford, CT (US)

(73) Assignee: PC Tel, Inc., Milpitas, CA (US)

( * ) Notice: Subject to any disclaimer, the term of this patent is extended or adjusted under 35 U.S.C. 154(b) by 0 days.

(21) Appl. No.: 09/478,455

(22) Filed: Jan. 6, 2000

(51) Int. Cl.[7] ............................. H04B 1/38; H04L 5/16
(52) U.S. Cl. ........................................ 375/222; 375/220
(58) Field of Search ................................ 375/222, 257, 375/258, 220, 228; 379/93.05, 399; 340/310.01, 310.03

(56) References Cited

U.S. PATENT DOCUMENTS

| | | | |
|---|---|---|---|
| 5,140,630 A | * 8/1992 | Fry et al. | 379/179 |
| 5,148,144 A | * 9/1992 | Sutterlin et al. | 340/310 |
| 6,147,963 A | * 11/2000 | Walker et al. | 370/200 |
| 6,212,226 B1 | * 4/2001 | Newton | 375/222 |
| 6,226,331 B1 | * 5/2001 | Gambuzza | 375/258 |

OTHER PUBLICATIONS

Specifications from Silicon Laboratories on 3.3 V International Digital Access Arrangement, 1999 revised, 43 pages.

* cited by examiner

Primary Examiner—Mohammad H. Ghayour
(74) Attorney, Agent, or Firm—David P. Gordon; David S. Jacobson; Thomas A. Gallagher

(57) ABSTRACT

A power supply includes a dc voltage source and circuitry which powers a modem data access arrangement (DAA) while preventing dc voltages from being applied to a private line; i.e., the private line is effectively isolated from dc voltages generated by the voltage sources. The circuitry permits ac signals from the modem to travel substantially unhindered over the private line. A first embodiment includes a split winding transformer, and a capacitor coupled across the voltage source. A second embodiment includes a standard transformer, an inductor and a capacitor. A third embodiment includes two capacitors and two inductors. The capacitors are coupled to the inputs of the DAA, while the inductors are coupled between the poles of the voltage source and respective inputs of the DAA.

19 Claims, 2 Drawing Sheets

POWER SUPPLY CIRCUITS FOR DATA ACCESS ARRANGEMENT ENABLING MODEM OPERATION OVER A PRIVATE LINE

BACKGROUND OF THE INVENTION

1. Field of the Invention

This invention relates broadly to telecommunications. More particularly, this invention relates to modems.

2. State of the Art

A modem is a computer hardware peripheral designed to convert digital signals generated by the computer into analog signals that can be modulated onto an analog transmission medium, such as a twisted pair copper wire telephone line, and demodulate the signals back into digital data at the receiving end. Modems used on a public switched telephone network (PSTN) telephone line (i.e., a "public line") have an interface to the telephone line called a data access arrangement, and commonly referred to as a DAA. The DAA provides functions such as dielectric isolation, dc termination, ac termination, ring detection, and protection from transients. This functionality can be implemented with transformers, inductors, and electromechanical relays, which are relatively bulky and expensive.

Various techniques have been used to reduce the size and cost of the DAA. As shown in prior art FIG. 1, a modem 10 includes modem circuitry 12 coupled to a "silicon" DAA 14. The silicon DAA 14 includes two integrated circuits 16, 18 (e.g., the Si3021 and Si3014, available from Silicon Laboratories) separated by a dielectric barrier (in this case a capacitor) 20, and minimal external components 22. This silicon DAA 14 implements the DAA functions and also integrates "analog front end" functions of analog-digital conversion, digital-analog conversion, and filtering. As a PSTN line to which the modem is coupled has 48V inherently present at all times, integrated circuit 18 is powered from the voltage on the public telephone line 24.

A "private line" or "leased line" is a telephone line directly connecting two businesses, a business and a home, or different departments in a business or institution, without going through the public switch telephone network. Modems intended to be used over a private line do not use many of the DAA functions required for modem use over the PSTN. Nevertheless, the silicon DAA would be a cost effective way in which to implement the analog front end functions of a modem over a private line even if the other DAA functions are not utilized. Therefore, it is desirable to allow modems designed for operation over public lines to also operate over private lines. However, unlike public lines, private lines are not powered, and therefore cannot power the integrated circuits of the silicon DAA. Therefore, prior art silicon DAAs cannot be used over private lines.

SUMMARY OF THE INVENTION

It is therefore an object of the invention to provide a power supply for a DAA to enable a DAA intended for use over a public line to operate over a private line.

It is another object of the invention to provide a power supply which does not adversely affect dielectric isolation, dc termination, and protection from transients.

It is also an object of the invention to provide a power supply which is relatively simple in design and relatively inexpensive to manufacture.

In accord with these objects, which will be discussed in detail below, a power supply is provided which includes a dc voltage source and circuitry which powers the DAA while preventing dc voltages from being applied to the private line; i.e., the private line is effectively isolated from dc voltages generated by the voltage sources. The circuitry further permits ac signals from the modem to travel substantially unhindered over the private line.

According to one embodiment of the invention, the circuitry coupled to the dc voltage source includes a split winding transformer, and a capacitor coupled across the voltage source. A first primary winding of the transformer is coupled in series between a positive pole of the voltage source and a positive input to the DAA and a second primary winding of the transformer is coupled in series between a negative pole of the voltage source and a negative input to the DAA.

According to a second embodiment, the circuitry coupled to the dc voltage source includes a standard transformer, an inductor and a capacitor. The inductor, the capacitor, and the primary winding of the transformer are arranged in series with the voltage source, with the capacitor coupled between the positive input to the DAA and the primary winding, and the inductor coupled between the positive pole of the voltage source and the positive input to the DAA.

According to a third embodiment of the invention, the circuitry coupled to the dc voltage source includes two capacitors and two inductors; no transformer is utilized. The capacitors are coupled to the inputs of the DAA, while the inductors are coupled between the poles of the voltage source and respective inputs of the DAA.

The voltage source in each embodiment externally supplies power to the DAA, while the circuitry couples the ac modem signals to and from the private line. The transformer (in the first and second embodiments) and capacitors (in the third embodiment) provide a dc dielectric barrier between the private line and the dc voltage source; i.e., isolate the private line from the dc voltage, yet permit ac signals to and from the DAA circuit to pass therethrough.

While each circuit has different advantages and disadvantages, each meets regulatory and performance requirements including dielectric isolation, longitudinal balance, frequency response, return loss/impedance, and tolerance to lightning surges and other transient voltages. In addition, since the power applied to the DAA is a known voltage and polarity, the DAA does not have to tolerate a wide range of dc voltages and current of either polarity. As such, components otherwise required for a silicon DAA adapted for use over the PSTN may be eliminated, thereby reducing the cost of the DAA.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
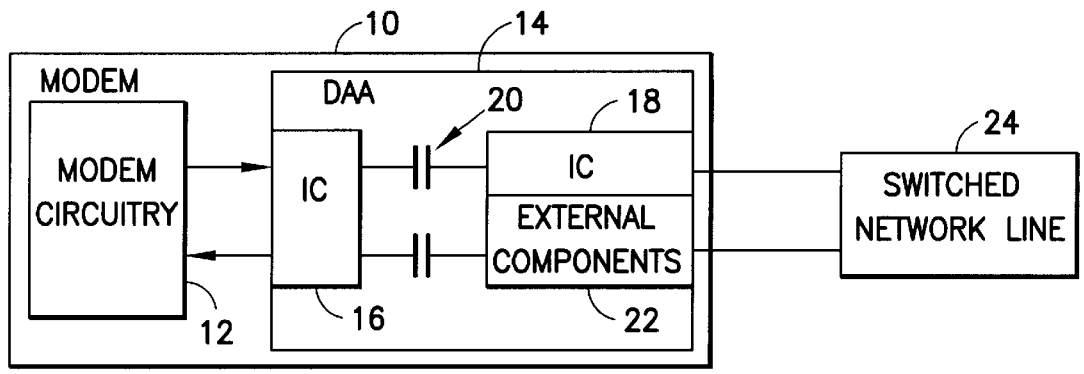
FIG. 1 is a schematic view of a modem utilizing a prior art silicon DAA.
Figure 2:
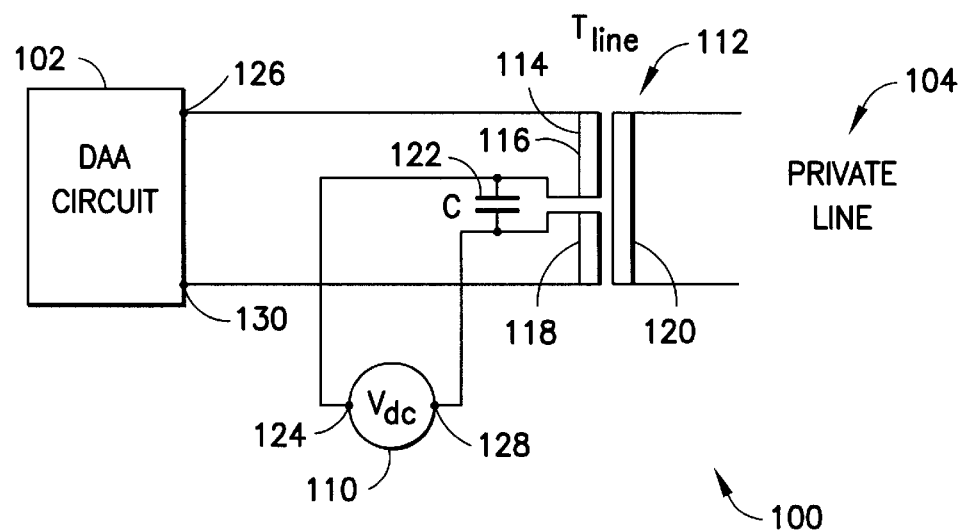
FIG. 2 is a schematic view of a silicon DAA adapted for private line use according to a first embodiment of the invention.

Turning now to FIG. 2, a first embodiment of a power supply circuit 100 designed to power to a silicon DAA 102 for operation over a private line 104 is shown. The circuit 100 includes a dc voltage source 110, a transformer 112 having a split primary winding 114 (defining first and second primary windings 116, 118) and a secondary winding 120, and preferably a capacitor 122. The dc voltage source 110 is coupled to the first and second primary windings of the transformer 112. In addition, when the capacitor 114 is used, it is provided across the voltage source 110 and is coupled in series between the first and second primary windings 116, 118 of the transformer. More particularly, the first primary winding 116 of the transformer 112 is coupled in series between a positive pole 124 of the voltage source 110 and a positive input 126 to the DAA 102 and the second primary winding 118 of the transformer is coupled in series between a negative pole 128 of the voltage source and a negative input 130 to the DAA.

The dc voltage source 110 needs to supply a minimum voltage to activate the DAA, e.g., 6–10$V_{dc}$, and need not provide the 48$V_{dc}$ typically found on a public switched telephone line. The transformer 112 functions as a high pass filter, preferably having a cutoff at 100–300 Hz. The capacitor 122, when used, preferably has a capacitance of 1–2 $\mu$F.

In operation, the dc voltage source 110 powers the DAA circuitry 102. The transformer 112 conducts the dc voltage into the DAA 102, yet permits the ac band signals of a modem to which the circuit 100 and DAA 102 are coupled to pass into the private line 104. The voltage source 110, as applied to the center of the split winding of the transformer 112, has minimal effect on balance of the circuit. Longitudinal balance and isolation are further insured by the transformer 112.

Figure 3:
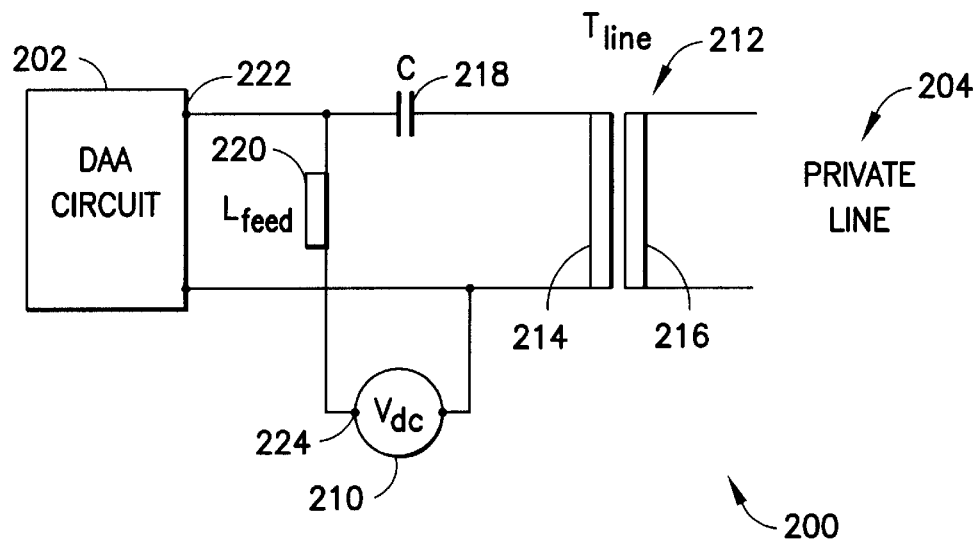
FIG. 3 is a schematic view of a silicon DAA adapted for private line use according to a second embodiment of the invention.

Turning to FIG. 3, a second embodiment of a power supply circuit 200 designed to power a silicon DAA 202 for operation over a private line 204 is shown. The circuit 200 includes a dc voltage source 210, a standard transformer 212 (having primary and secondary windings 214, 216, respectively), a capacitor 218 between the voltage source and the transformer, and an inductor 220 between the voltage source and the capacitor. More particularly, the capacitor 218, the inductor 220, and the primary winding 214 of the transformer 212 are arranged in series with the voltage source 210. The capacitor 218 is coupled between the positive input 222 to the DAA 202 and the primary winding 214, and the inductor 220 is coupled between the positive pole 224 of the voltage source and the positive input 222 to the DAA.

The capacitor 218, having a capacitance of 1–2 $\mu$F, blocks the dc power from the transformer 212 (redirecting the power to the DAA 202), yet permits the ac modem signals to pass relatively unhindered therethrough. The inductor 220, having an inductance of 200 mH to 1 H, provides a large AC impedance across the line and prevents $V_{dc}$ from having a low impedance appearance, thereby preventing destruction of the ac path.

The longitudinal balance and isolation are insured by the transformer. In addition, as the transformer carries no dc current, a relatively inexpensive standard transformer (as opposed to the relatively expensive split winding transformer in the first embodiment) may be used.

Figure 4:
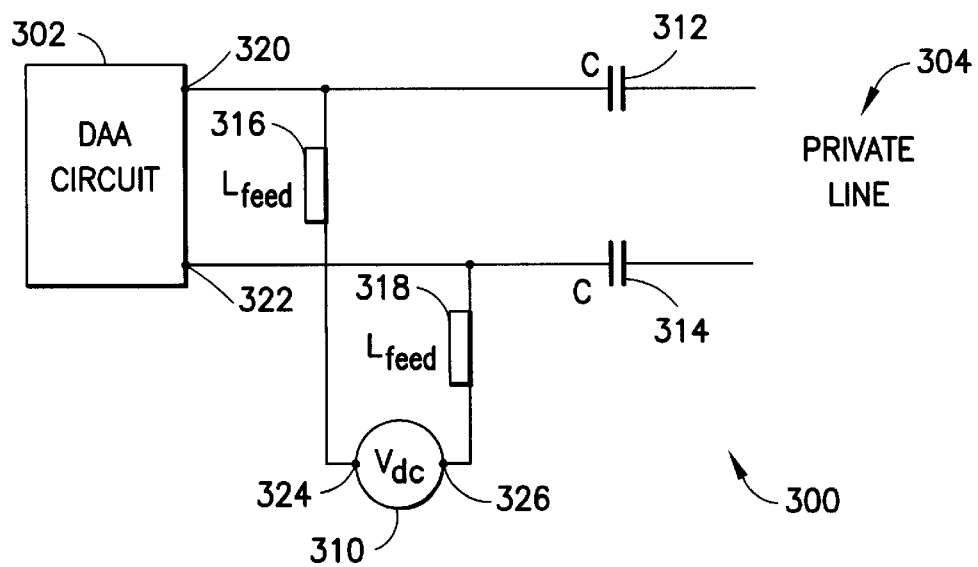
FIG. 4 is a schematic view of a silicon DAA adapted for private line use according to a third embodiment of the invention.

Referring now to FIG. 4, a third embodiment of a power supply circuit 300 designed to power a silicon DAA 302 for operation over a private line 304 is shown. The circuit 300 includes a dc voltage source 310, two capacitors 312, 314, a first inductor 316 and preferably a second inductor 318. More particularly, the capacitors 312, 314 are coupled to the inputs 320, 322 of the DAA 302, while the inductors 316, 318 are coupled between the poles 324, 326 of the voltage source 310 and respective inputs 320, 322 of the DAA. Notably, the circuit 300 does not require a transformer.

With the arrangement of the third embodiment, the voltage source is balanced and isolated from the private line, as the two capacitors 312, 314 block the dc power from entering the private line and reflect the dc into the DAA circuit 302. In addition, the capacitors preferably have a relatively large capacitance, e.g., one to two microfarads, for frequency response, and preferably should also be rated for high voltage to handle voltage surges. The first inductor operates as described above with respect to the second embodiment of the invention; i.e., functions as a high impedance across the line and prevents $V_{dc}$ from having a low impedance appearance. The optional second inductor 318 provides enhanced balance to ground. The inductors preferably have relatively large inductance, e.g., 500 milli-Henries (and high impedance to modem frequencies) and must carry dc current. Together, the capacitors and inductors act as high pass filters.

The above described circuitry permits a silicon DAA developed for use over a public line to be operated over a private line. The several embodiments of the power supply circuit according to the invention are adapted to power a DAA while providing dielectric isolation, longitudinal balance, appropriate frequency response, proper return loss/impedance, and tolerance to lightning surges and other transient voltages.

There have been described and illustrated herein several embodiments of circuitry to power a DAA. While particular embodiments of the invention have been described, it is not intended that the invention be limited thereto, as it is intended that the invention be as broad in scope as the art will allow and that the specification be read likewise. Thus, while particular preferred values for the voltage of the power source, the cutoff of the transformers, the capacitance of the capacitors, and the inductance of the inductors have been disclosed, it will be appreciated that other values may be used as well. Moreover, while the invention has been discussed with respect to an analog modem, it will be appreciated that it may also be used in conjunction with a DAA configured for a digital modem. It will therefore be appreciated by those skilled in the art that yet other modifications could be made to the provided invention without deviating from its spirit and scope as claimed.

What is claimed is:

1. A computer modem for transmitting signals over a private telephone line, comprising:

a) means for converting digital signals generated by the computer into analog signals and demodulating analog signals into digital data;

b) a data access arrangement (DAA) for coupling the modem to the private telephone line; and c) a power supply which powers said data access arrangement, said power supply including,
i) a dc voltage source, and
ii) circuitry which powers said DAA with said voltage source while preventing dc voltages from being applied to the private line, said circuitry further permitting said analog signals from said modem to travel substantially unhindered over the private line.

2. A computer modem according to claim 1, wherein:
said circuitry includes a transformer.

3. A computer modem according to claim 2, wherein:
said transformer is provided with a split primary winding.

4. A computer modem according to claim 3, wherein:
said DAA includes a positive input and a negative input, said voltage source includes a positive pole and a negative pole, and said split winding includes first and second primary windings,
said first primary winding being coupled in series between said positive pole of said voltage source and said positive input of said DAA, and said second primary winding being coupled in series between said negative pole of said voltage source and said negative input of said DAA.

5. A computer modem according to claim 4, wherein:
said circuitry further includes a capacitor coupled in series with and between said first and second primary windings.

6. A computer modem according to claim 2, wherein:
said circuitry further includes an inductor and a capacitor, wherein said inductor, said capacitor, and said primary winding of said transformer are arranged in series with said voltage source.

7. A computer modem according to claim 6, wherein:
said DAA includes positive and negative inputs, and said voltage source includes positive and negative poles, said capacitor being coupled between said positive input of said DAA and said primary winding, and said inductor being coupled between said positive pole of said voltage source and said positive input of said DAA.

8. A computer modem according to claim 1, wherein:
said DAA includes positive and negative inputs and said voltage source includes positive and negative poles, and said circuitry includes first and second capacitors, and a first inductor,
said first and second capacitors being coupled to said positive and negative inputs, respectively, and said first inductor being coupled between one of said positive and negative poles of said voltage source and a respective of said positive and negative inputs of said DAA.

9. A computer modem according to claim 8, wherein:
a second inductor is provided between the other of said positive and negative poles of said voltage source and the other of said positive and negative inputs of said DAA.

10. A computer modem according to claim 2, wherein:
said transformer has a cutoff between 100 Hz–300 Hz.

11. A computer modem according to claim 1, wherein:
said DAA comprises at least one integrated circuit.

12. A data access arrangement (DAA) for coupling a modem to a private telephone line, said modem having means for converting digital signals generated by a computer into analog signals and demodulating analog signals into digital data, said DAA comprising:

a) an interface adapted to couple the modem to the private line, said interface including at least one integrated circuit; and b) a power supply coupled to said interface which powers said at least one integrated circuit, said power supply including,
 i) a dc voltage source, and
 ii) circuitry which powers said DAA with said voltage source while preventing dc voltages from being applied to the private line, said circuitry further permitting said analog signals from said modem to travel substantially unhindered over the private line.

13. A DAA according to claim 12, wherein:
said circuitry includes a transformer.

14. A DAA according to claim 13, wherein:
said transformer is provided with a split primary winding.

15. A DAA according to claim 14, wherein:
said interface includes a positive input and a negative input, said voltage source includes a positive pole and a negative pole coupled to said positive input and said negative input, respectively, and said split primary winding includes first and second primary windings,
wherein said first primary winding is coupled in series between said positive pole of said voltage source and said positive input of said DAA, and said second primary winding is coupled in series between said negative pole of said voltage source and said negative input of said DAA, and
said circuitry includes a capacitor coupled in series with and between said first and second primary windings.

16. A DAA according to claim 14, wherein:
said circuitry further includes an inductor and a capacitor, wherein said inductor, said capacitor, and said primary winding of said transformer are arranged in series with said voltage source.

17. A DAA according to claim 16, wherein:
said interface includes positive and negative inputs, and said voltage source includes positive and negative poles respectively coupled to said positive and negative inputs, said capacitor being coupled between said positive input of said interface and said primary winding, and said inductor being coupled between said positive pole of said voltage source and said positive input of said interface.

18. A DAA according to claim 14, further including:
said interface includes positive and negative inputs and said voltage source includes positive and negative poles coupled to said positive and negative inputs, respectively, and said circuitry includes first and second capacitors, and a first inductor,
said first and second capacitors being coupled to said positive and negative inputs, respectively, and said first inductor being coupled between one of said positive and negative poles of said voltage source and a respective of said positive and negative inputs of said interface.

19. A DAA according to claim 18, wherein:
a second inductor is provided between the other of said positive and negative poles of said voltage source and the other of said positive and negative inputs of said interface.

* * * * *